US006405271B1

(12) United States Patent
MacWilliams et al.

(10) Patent No.: US 6,405,271 B1
(45) Date of Patent: *Jun. 11, 2002

(54) DATA FLOW CONTROL MECHANISM FOR A BUS SUPPORTING TWO-AND THREE-AGENT TRANSACTIONS

(75) Inventors: Peter D. MacWilliams, Aloha; Nitin V. Sarangdhar, Portland; Stephen S. Pawlowski, Beaverton; Gurbir Singh, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/709,215

(22) Filed: Sep. 6, 1996

Related U.S. Application Data (63) Continuation-in-part of application No. 08/302,600, filed on Sep. 8, 1994, now Pat. No. 5,615,343.

(51) Int. Cl.$^7$ .............................................. G06F 13/00
(52) U.S. Cl. ........................ 710/109; 710/105; 710/107
(58) Field of Search ................................ 710/100, 107, 710/108, 109, 110, 112, 105; 711/143, 146

(56) References Cited

U.S. PATENT DOCUMENTS

| | | | |
|---|---|---|---|
| 4,181,974 A | * 1/1980 | Lemay et al. ............... | 709/225 |
| 5,235,684 A | * 8/1993 | Becker et al. ............... | 710/100 |
| 5,528,764 A | 6/1996 | Heil et al. | |
| 5,551,005 A | 8/1996 | Sarangdhar et al. | |
| 5,555,425 A | * 9/1996 | Zeller et al. ................. | 395/293 |
| 5,568,620 A | 10/1996 | Sarangdhar et al. | |
| 5,608,881 A | * 3/1997 | Masumura et al. ......... | 395/306 |
| 5,615,343 A | * 3/1997 | Sarangdhar et al. ........ | 395/292 |
| 5,696,910 A | * 12/1997 | Pawlowski .................. | 395/293 |
| 5,699,516 A | * 12/1997 | Sapir et al. .................. | 395/287 |
| 5,758,106 A | * 5/1998 | Fenwick et al. ............. | 395/292 |

OTHER PUBLICATIONS

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

PCT International Search Report for International Application No. PCT/US96/11419, dated Oct. 30, 1997.

\* cited by examiner

*Primary Examiner*—Peter S. Wong
*Assistant Examiner*—Xuong M. Chung-Trans
(74) *Attorney, Agent, or Firm*—Blakely, Sokoloff, Taylor & Zafman LLP (57) ABSTRACT

A data flow control mechanism for a bus supporting two- and three-agent transactions includes a control logic to place an indication of a request onto a computer system bus. The agent placing the indication on the bus then waits to place data corresponding to the request onto the bus until it has received an indication from another agent coupled to the bus that the other agent is ready to receive the data.

15 Claims, 5 Drawing Sheets

DATA FLOW CONTROL MECHANISM FOR A BUS SUPPORTING TWO-AND THREE-AGENT TRANSACTIONS

The present invention is also a continuation-in-part of application number 08/302,600 filed Sep. 8, 1994, now U.S. Pat. No. 5,615,343, entitled "Method and Apparatus for Performing Deferred Transactions" to Sarangdhar, et al., a co-inventor of the instant application and commonly assigned to the assignee of the present application.

BACKGROUND OF THE INVENTION

1. Field of the Invention

The present invention pertains to computer systems and computer system buses. More particularly, this invention relates to controlling data flow on a computer system bus which supports two- and three-agent transactions.

2. Background

Modern computer systems typically have multiple agents coupled together via a system bus. Typically, the agents are integrated circuit chips with multiple pins coupling each agent to the bus. These agents may include, for example, a processor(s), a memory device(s), a mass storage device(s), etc. In order for the computer system to operate properly, these agents should be able to effectively communicate with each other via the bus.

One aspect of this communication is the transfer of data from one agent to another. The transfer of data on the bus is referred to as the data flow on the bus. In many computer systems, an agent which can be the target of a data transfer has a storage space, such as a data buffer, into which the transferred data is placed. However, agents typically have a limited amount of storage space for data. Therefore, situations can arise where the targeted agent for a data transfer does not have sufficient storage space to store the data. Additionally, it is often the case that only the targeted agent knows whether it has sufficient storage space to store the data. Thus, it would be beneficial to provide a mechanism that allows the agent which is targeted by a request to control the flow of data on the bus for that request.

Additionally, one type of bus which can be used in a computer system is referred to as a latched bus. In a latched bus system, data is latched into a storage space from the bus in one clock cycle and control signals based on that data can be placed on the bus in any of the subsequent clock cycles. In contrast, in a non-latched bus system, data is received from the bus in one clock cycle and control signals based on that data can be placed on the bus in that same clock cycle. Due to the nature of the latched bus, some solutions for controlling data flow on the bus which work on a non-latched bus are too inefficient to work on a latched bus. For example, on a non-latched bus, data can be placed on the bus by a source agent which can wait until it receives a ready signal from the targeted agent, at which point the source agent provides, in the same clock cycle as it receives the ready signal, the next data. However, this concept of waiting for, receiving, and processing the ready signal for each data transfer takes too much time on a latched bus because the ready signal would be received in one clock cycle, processed in the next clock cycle, and then the next data would be placed on the bus. Therefore, it would be beneficial to provide a mechanism that allows the targeted agent to more efficiently control the flow of data on a latched bus.

Furthermore, some computer systems include one or more cache memories, each of which is faster and smaller than the main system memory. The cache memory typically allows data which has been recently accessed by an agent, or which is predicted to be accessed soon by an agent, to be available in a faster memory, thereby reducing the time required to obtain the data and increasing overall system performance. Different agents, such as different processors, on a bus will often have their own cache memory. These agents are then able to modify the data stored in their cache memory without making the same modifications to the main memory until a later time. However, situations can arise where data which is requested by a first agent is stored in a cache memory of a second agent, and the requested data in the second agent's cache memory has been modified. Therefore, the data to be returned to the first agent should come from the cache memory of the second agent, not from the main memory because the data in the cache memory is a more recent version. One solution to this problem is to transfer the requested data from the second agent to the first agent and have the memory controller for the main memory also take the data off the bus. A transaction such as this which uses the first and second agents, as well as the memory controller, is referred to as a three-agent transaction. However, this solution presumes that the memory controller has sufficient storage space to take the data off the bus, which is not always the case. Thus, it would be beneficial to provide a mechanism which allows the memory controller to maintain data flow control on the bus for a three-agent transaction.

As will be described in more detail below, the present invention provides a data flow control mechanism for a bus supporting two- and three-agent transactions to achieve these and other desired results which will be apparent to those skilled in the art from the description that follows.

SUMMARY OF THE INVENTION

A data flow control mechanism for a bus supporting two- and three-agent transactions is described herein. An apparatus in accordance with the data flow control mechanism of the present invention includes a control logic to place an indication of a request onto a computer system bus. The apparatus then waits to place data corresponding to the request onto the bus until it has received an indication from an agent coupled to the bus that the agent is ready to receive the data.

In one embodiment of the present invention, the data flow control mechanism supports both two- and three-agent transactions. In a two-agent transaction in accordance with this embodiment, data is transferred from a source agent to a target agent, with the target agent maintaining control of the data flow. In a three-agent transaction in accordance with this embodiment, data is transferred from a snooping agent to either the source agent or the target agent, as well as possibly from the source agent to the target agent. In the three-agent transaction, the target agent controls the data flow of transfers to the target agent, regardless of whether they originated with the source agent or the snooping agent.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the discussions to follow, certain signals are discussed which include a "#". This notation is used to indicate a signal which is active when in a low state (that is, a low voltage). It is to be appreciated, however, that the present invention includes implementations where these signals are active when in a high state rather than when in a low state. Similarly, the present invention includes implementations where signals discussed herein which do not include a "#" are active when in a low state.

The present invention provides a mechanism for controlling data flow on a bus which supports two- and three-agent transactions. The mechanism allows an agent which is to receive data from the bus to control the flow of data on the bus. The agent which is to receive data indicates when it is ready to receive the data, at which time another agent on the bus, which is the source of the data being transferred, places the data on the bus.

Figure 1:
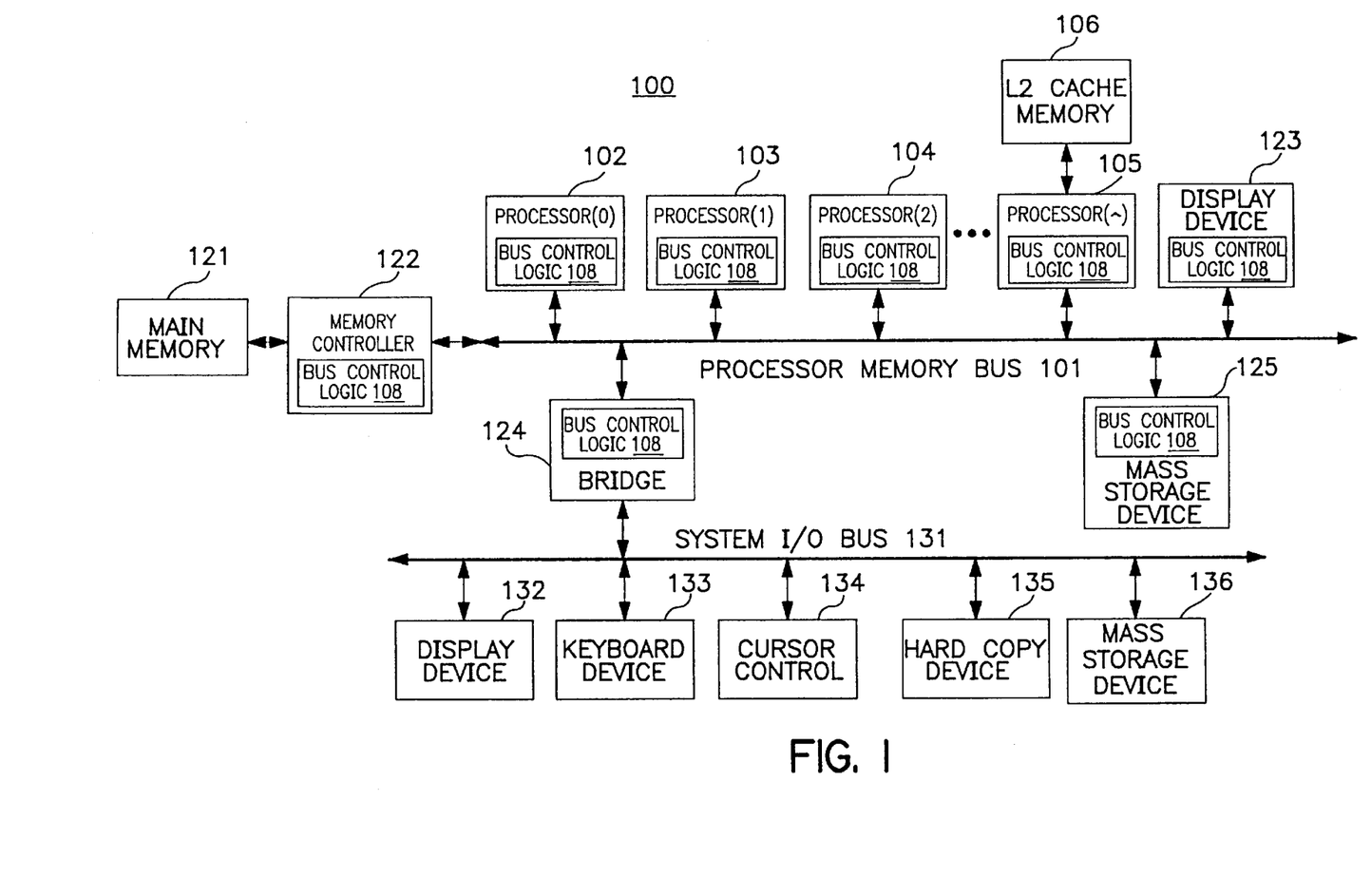
FIG. 1 illustrates a multiprocessor computer system such as may be used with one embodiment of the present invention.

FIG. 1 illustrates a multiprocessor computer system such as may be used with one embodiment of the present invention. The computer system 100 generally comprises a processor-memory bus or other communication means 101 for communicating information between different agents coupled to the bus 101, such as processors, bus bridges, memory devices, peripheral devices, etc. The processor-memory bus 101 includes arbitration, address, data and control buses (not shown). In one embodiment, the bus 101 is a latched bus having a data bus width of 64 bits.

In one embodiment of the present invention, each of the one or more processors 102, 103, 104, and 105 includes a small, extremely fast internal cache memory (not shown), commonly referred to as a level one (L1) cache memory for temporarily storing data and instructions on-chip. In addition, a biggerlevel two (L2) cache memory 106 can be coupled to any one of the processors, such as processor 105, for temporarily storing data and instructions for use by the processor(s). Each processor may have its own L2 cache, or some may share an L2 cache.

Processors 102, 103, and 104 may each be a parallel processor (a symmetric co-processor), such as a processor similar to or the same as processor 105. Alternatively, processor 102, 103, or 104 may be an asymmetric co-processor, such as a digital signal processor. In addition, processors 102 through 105 may include processors of different types. In one embodiment, the present invention includes Intel® Architecture microprocessors as processors 102 through 105, such as i386™, i486™, Pentium®, or Pentium® Pro microprocessors. However, the present invention may utilize any type of microprocessor architecture. It is to be appreciated that the particular architecture(s) used is not especially germane to the present invention.

The processor-memory bus 101 provides system access to the memory and input/output (I/O) subsystems. A memory controller 122 is coupled to the processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to the processor-memory bus 101.

Each of the agents coupled to the bus, including processors 102–105 and memory controller 122, include a bus control logic 108 which acts as an interface between the agent and the bus 101, both of which may run at different clock speeds. The bus control logic 108 includes the latches and necessary circuitry for driving signals onto and receiving signals from the bus 101.

An input/output (I/O) bridge 124 may be coupled to the processor-memory bus 101 and a system I/O bus 131 to provide a communication path or gateway for devices on either processor-memory bus 101 or I/O bus 131 to access or transfer data between devices on the other bus. Essentially, the bridge 124 is an interface between the system I/O bus 131 and the, processor-memory bus 101.

The I/O bus 131 communicates information between peripheral devices in the computer system. Devices that may be coupled to the system bus 131 include, for example, a display device 132, such as a cathode ray tube, liquid crystal display, etc., an alphanumeric input device 133 including alphanumeric and other keys, etc., for communicating information and command selections to other devices in the computer system (e.g., the processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to the system bus 131.

In certain implementations of the present invention, additional processors or other components may be included. Additionally, in certain implementations components may be re-arranged. For example, the L2 cache memory 106 may lie between the processor 105 and the processor-memory bus 101. Furthermore, certain implementations of the present invention may not require nor include all of the above components. For example, the processors 102 through 104, the display device 123, or the mass storage device 125 may not be coupled to the processor-memory bus 101. Additionally, the peripheral devices shown coupled to the system I/O bus 131 may be coupled to the processor-memory bus 101; in addition, in some implementations only a single bus may exist with the processors 102 through 105, the memory controller 122, and the peripheral devices 132 through 136 coupled to the single bus.

Figure 2:
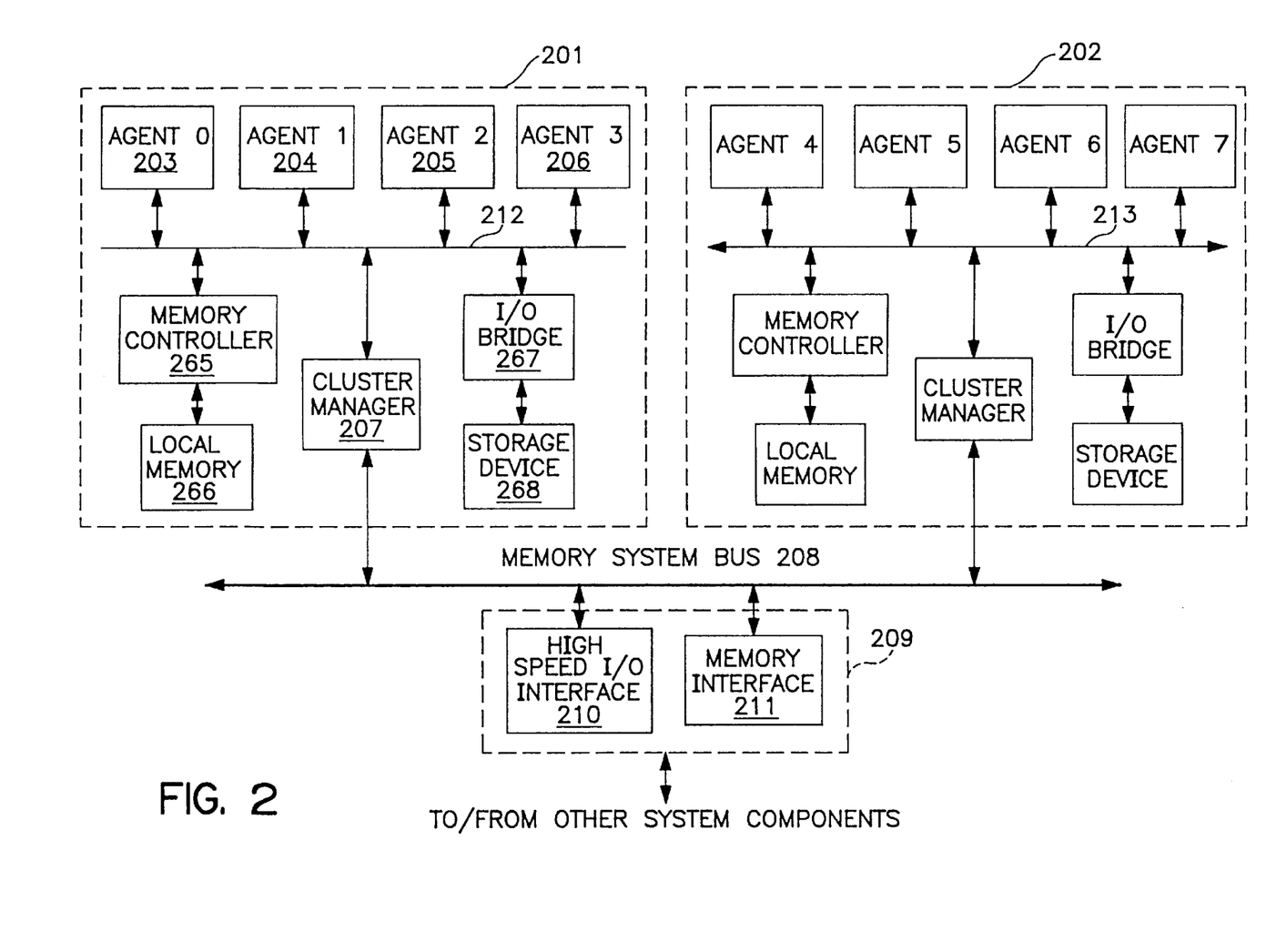
FIG. 2 is a block diagram illustrating a bus cluster system such as may be used with one embodiment of the present invention.

FIG. 2 is a block-diagram illustrating a bus cluster system such as may be used with one embodiment of the present invention. FIG. 2 shows two clusters 201 and 202 of agents. Each of these clusters is comprised of a number of agents. For example, the cluster 201 is comprised of four agents 203–206 and a cluster manager 207, which may include another cache memory (not shown), coupled to the bus 212. The agents 203–206 can include microprocessors, co-processors, digital signal processors, etc.; for example, the agents 203 through 206 may be the same as the processor 105 shown in FIG. 1. The cluster manager 207 and its cache are shared between these four agents 203–206. Each cluster is coupled to a memory-system bus 208. These clusters 201 and 202 are coupled to various other components of the computer system through a system interface 209. The system-interface 209 includes a high speed I/O interface 210 for interfacing the computer system to peripheral devices (not shown) and a memory interface 211 which provides access to a global main memory (not shown), such as a DRAM memory array. In one embodiment, the high speed I/O interface 210 is the bridge 124 of FIG. 1, and the memory interface 211 is the memory controller 122 of FIG. 1.

In one embodiment of the present invention, each cluster also includes a local memory controller and/or a local I/O bridge. For example, the cluster 201 may include a local memory controller 265 coupled to the processor bus 212. The local memory controller 265 manages accesses to a RAM or other local memory 266 contained within the cluster 201. The cluster 201 may also include a local I/O bridge 267 coupled to the processor bus 212. Local I/O bridge 267 manages accesses to I/O devices within the cluster, such as a mass storage device 268, or to an I/O bus, such as system I/O bus 131 of FIG. 1.

In another embodiment of the present invention, the local memory of each cluster is part of the global memory and I/O space for the entire system. Therefore, in this embodiment the system interface 209 need not be present because the individual local memory and I/O bridges make up the global memory system.

In one embodiment of the present invention, the buses 212 and 213 and the memory-system bus 208 operate analogous to the processor-memory bus 101 of FIG. 1.

Certain implementations of the present invention may not require nor include all of the above components. For example, the cluster 201 or 202 may comprise fewer than four agents. Alternatively, the cluster 201 or 202 may not include the memory controller, local memory, I/O bridge, and storage device. Additionally, certain implementations of the present invention may include additional processors or other components.

In one embodiment of the present invention, bus transactions occur on the processor-memory buses described above in FIGS. 1 and 2 in a pipelined manner. That is, multiple bus transactions may be pending at the same time, wherein each is not fully completed. Therefore, when a requesting agent (also referred to as a source agent) begins a bus transaction by driving an address onto the address bus, the bus transaction may be only one of a number of bus transactions currently pending. Although bus transactions are pipelined, the bus transactions do not have to be fully completed in order; completion replies to requests can be out-of-order.

In the bus used with one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions, or in unaligned memory operations which software expects to be atomic. In this embodiment, a transaction is the set of bus activities related to a single request, from request bus arbitration through the completion of the transaction (e.g., a normal or implicit writeback response) during the Response Phase.

In one embodiment, a transaction contains up to six distinct phases. However, certain phases are optional based on the transaction and response type. Alternatively, additional phases could also be added. A phase uses a particular signal group to communicate a particular type of information. In one implementation, these phases are:

Arbitration Phase
Request Phase
Error Phase
Snoop Phase
Response Phase
Data Transfer Phase In one mode, the data transfer phase is optional and is used if a transaction-is transferring data. The data phase is request-initiated if the data is available at the time of initiating the request (for example, for a write transaction). The data phase is response-initiated if the data is available at the time of generating the transaction response (for example, for a read transaction). A transaction may contain both a request-initiated data transfer and a response-initiated data transfer.

Figure 3:
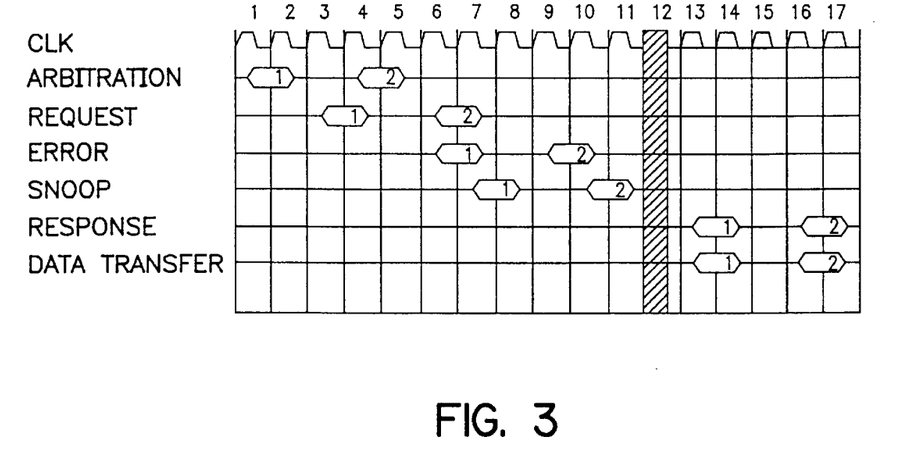
FIG. 3 shows an example of overlapped phases for two transactions according to one embodiment of the present invention.

Different phases from different transactions can overlap, thereby pipelining bus usage and improving bus performance. FIG. 3 shows an example of overlapped phases for two transactions. Referring to FIG. 3, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clocks after ownership is requested.

The second phase is the request phase, in which the bus owner drives a request and address information on the bus. In one implementation, the request phase is one or more clocks after bus ownership is granted (provided there is an arbitration phase), and is two clocks long. In the first clock, an address signal is driven along with the transaction type and sufficient information to begin snooping a memory access. In the second clock, byte enables used to identify which bytes of data should be transferred if the data transfer is less than the data bus width, a transaction identifier used to uniquely identify the transaction in the event a deferred response is given to the request, and the requested data transfer length are driven, along with other transaction information.

The third phase of a transaction is an error phase. The error phase indicates any immediate errors, such as parity errors, triggered by the request. If an error is discovered, an error signal is asserted during the error phase by the agent which detected the error in the transaction. When an error is indicated, the transaction is immediately dropped (that is, the transaction progresses no further in the pipeline) and may be re-driven by the agent which issued the transaction. Whether the agent re-issues the transaction depends on the agent itself. In one implementation, the error phase is three clocks after the request phase.

In one embodiment, every transaction that is not canceled because of an error in the error phase has a snoop phase. The snoop phase indicates if the cache line accessed in a transaction is not valid, valid or modified (dirty) in any agent's cache. In one implementation, the snoop phase is four or more clocks from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation, the snoop window is a single bus clock.

The response phase indicates whether the transaction failed or succeeded, whether the response is immediate or deferred, whether the transaction will be retried, or whether the transaction includes data phases. If a transaction contains a response-initiated data phase, then it enters the data transfer phase along with the response phase.

If the transaction does not have a data phase, then that transaction is complete after the response phase. If the requesting agent has write data to transfer or has requested read data, the transaction has a data phase which may extend beyond the response phase in the former case and will be coincident with or extend beyond the Response Phase in the latter case. The data phase occurs only if a transaction requires a data transfer. The data phase can be response initiated (for example, by the memory controller or another processor) or request initiated.

The bus accommodates deferred transactions by splitting a bus transaction into two independent transactions. The first transaction involves a request by a requesting agent and a response by the responding agent. In one embodiment the request comprises the sending of an address on the address bus and a first token (also referred to as a transaction identifier). The response includes the sending of the requested data (or completion signals) if the responding agent is ready to respond. In this case, the bus transaction ends.

However, if the responding agent is not ready to complete the bus transaction, then the responding agent may send a deferred response over the bus during the response phase. Sending of a deferred response allows other transactions to be issued and not be held up by the completion of this transaction. The requesting agent receives this deferred response. When the responding agent is ready to complete the deferred bus transaction, the responding agent arbitrates for ownership of the bus. Once bus ownership is obtained, the responding agent sends a deferred reply transaction including a second token on the bus. The requesting agent monitors the bus and receives the second token as part of the deferred reply transaction. The requesting agent latches the second token and determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token from the responding agent does match the first token, then the data on the bus (or the completion signals) is the data originally requested by the requesting agent and the requesting agent latches the data on the data bus.

It is to be appreciated that, due to the pipelined nature of the bus, multiple transactions can be at different stages of the bus at different times. For example, one transaction can be in the snoop phase, while a second transaction is in the error phase, and yet a third transaction can be in the request phase. Thus, error signals and request signals can both be issued concurrently on the bus even though they correspond to different transactions.

In one embodiment of the present invention, up to eight transactions can be outstanding on the bus at any particular time and up to sixteen transactions can be waiting for a deferred response at any particular time.

The present invention supports both read and write transactions. In a read transaction data is transferred from the targeted agent, typically a memory controller, to the requesting agent, typically a processor. In a write transaction, data is transferred from the requesting agent, typically a processor, to the targeted agent, typically a memory controller.

Additionally, one embodiment the present invention also supports an implicit writeback, which is part of a read or write transaction. An implicit write back occurs when a requesting agent places a request on the bus for a cache line which is stored in a modified state in a cache coupled to the bus. For example, an agent may perform a write transaction over the bus of eight bytes of data, however the cache line which includes those eight bytes is stored in modified state in another agent's cache. In this situation, the cache which contains the cache line in modified state (or the agent which is coupled to the cache) issues a hit modified signal on the bus during the snoop phase for the transaction. The requesting agent places the eight bytes of write data onto the bus, which are retrieved by the targeted agent. Then, in the data transfer phase of the transaction, the cache which contains the cache line in modified state writes the cache line, which is 32 bytes in one implementation, to the bus. Any of the data in the cache line which was not written to by the requesting agent is then merged with the write data from the original data transfer.

In one embodiment of the present invention, an additional control signal on the bus is used to control the flow of data on the bus. In one implementation, this signal is the Target Ready (TRDY#) signal. The agent which is to be the recipient of the data for a transaction asserts the TRDY# signal to indicate that it is ready to receive the data for the transaction from a particular agent. In one embodiment, an agent issuing a read request does not assert the TRDY# signal. In this embodiment, the agents on the bus presume that the requesting agent, in issuing a read request, is ready to receive the requested data.

In one embodiment of the present invention, the memory controller on the bus, such as memory controller 122 of FIG. 1, or local memory controller 264 or interface 211 of FIG. 2, has responsibility for asserting and deasserting the TRDY# signal. Thus, in this embodiment of the present invention, the memory controller has the ability to control the flow of data on the bus.

The memory controller on the bus includes a bus control logic, as illustrated in FIG. 1. The bus control logic includes one or more data buffers (not shown) into which the memory controller can temporarily store write data received from the bus prior to storing the data in the main memory. When a request is issued on the bus, the memory controller decodes the address and determines the size of the data transfer associated with the request, and whether the request targets the memory controller. The memory controller can then delay assertion of the TRDY# signal until it has an available data buffer into which the data to be transferred can be placed.

Figure 4:
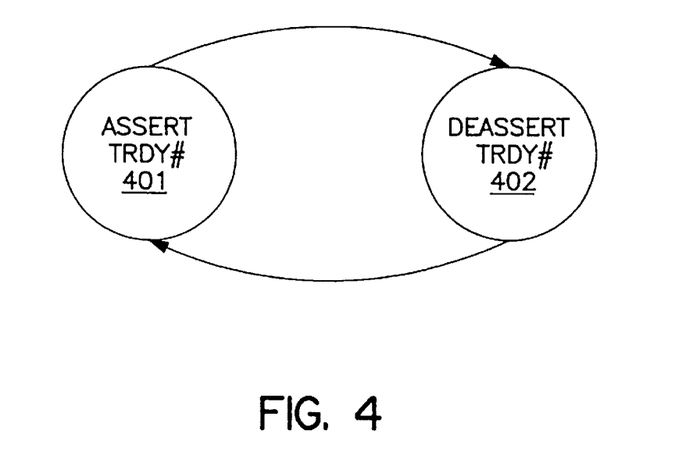
FIG. 4 is a state diagram illustrating the different states for the TRDY# signal in accordance with one embodiment of the present invention.

According to one embodiment of the present invention, the memory controller which is responsible for assertion and deassertion of the TRDY# signal includes a state machine to indicate when the TRDY# signal is to be asserted and deasserted. FIG. 4 is a state diagram illustrating the different states for the TRDY# signal in accordance with one embodiment of the present invention. As illustrated, the memory controller can either assert the TRDY# signal, state 401, or deassert the TRDY# signal, state 402. The memory controller initializes at system reset to state 402 with the TRDY# signal being deasserted. Whether the memory controller will transition to the assert TRDY# state 401 depends on whether the reason for asserting the TRDY# signal is data provided by the requesting agent as part of a write transaction or data provided by a snooping agent as part of an implicit writeback. However, it is to be appreciated that, regardless of the source of the data, the memory controller does not assert the TRDY# signal until it is ready to receive the data.

According to one embodiment of the present invention, the memory controller transitions to the assert TRDY# state 401 in response to a write transaction initiated by an agent on the bus when the following two conditions have been satisfied: (1) it is at least three clocks after the address strobe (ADS#) signal for the request has been asserted; and (2) it is at least one clock after the response for the previous transaction on the pipelined bus has been driven.

According to one embodiment of the present invention, the memory controller transitions to the assert TRDY# state 401 in response to an implicit writeback, which could be the result of either a read or write transaction from the requesting agent, such that the following two conditions are satisfied: (1) if the transaction also has a request initiated data transfer (that is, the requesting agent initiated a write transaction), then TRDY# is deasserted for at least one clock between the TRDY# for the write and the TRDY# for the implicit writeback; and (2) for both request and response initiated data transfers, it is at least one clock after the response for the previous transaction on the pipelined bus has been driven.

Regardless of how the memory controller transitioned to the assert TRDY# state 401, the memory controller transitions back to the deassert TRDY# state 402 as soon as it can be ensured that the TRDY# deassertion meets the following five conditions: (1) the previous TRDY# deassertion occurred three or more clocks from the current TRDY# deassertion point; (2) TRDY# may be deasserted when the inactive data bus busy (DBSY#) signal, defined below, and the active TRDY# signal are observed for at least one clock; (3) TRDY# can be deasserted within one clock if DBSY# was observed inactive on the clock TRDY# is asserted; (4) TRDY# does not need to be deasserted until the response is active; and (5) TRDY# for a request initiated transfer must be deasserted before the response to allow the TRDY# for an implicit writeback if one is required.

Figure 5:
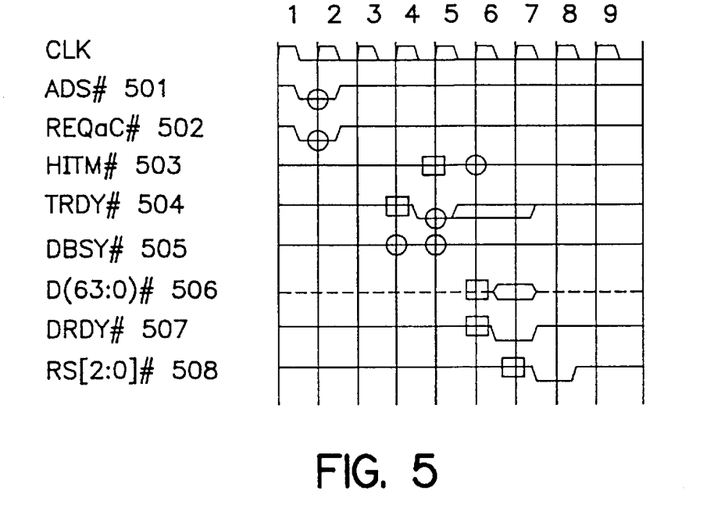
FIG. 5 is a timing diagram illustrating the timing of signals in performing a write transaction according to one embodiment of the present invention.
Figure 6:
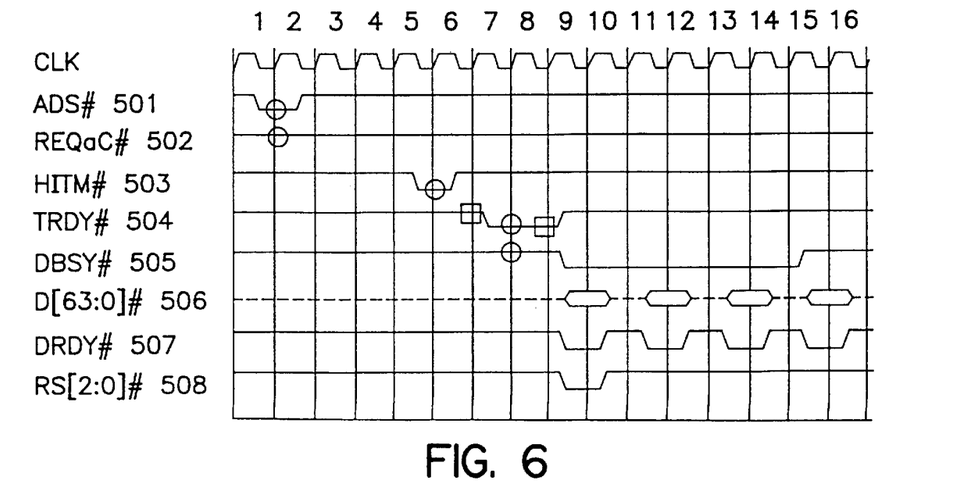
FIG. 6 is a timing diagram illustrating the timing of signals in performing a read transaction with an implicit writeback according to one embodiment of the present invention.
Figure 7:
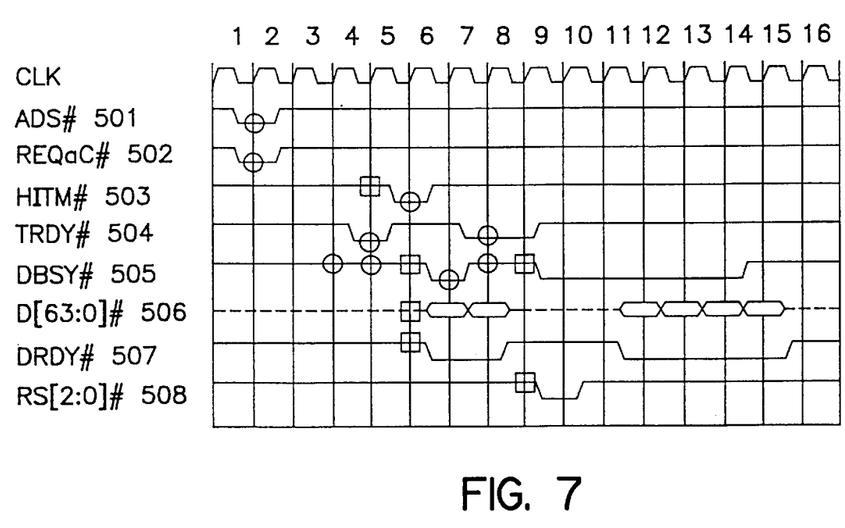
FIG. 7 is a timing diagram illustrating the timing of signals in performing a write transaction with an implicit writeback according to one embodiment of the present invention.

FIGS. 5–7 provide examples of timing diagrams illustrating the TRDY# signal according to various embodiments of the present invention. A summary of the signals used in FIGS. 5–7 is shown below in Table I.

| Signal | Description |
| --- | --- |
| CLK | The bus clock. |
| ADS# | Address Strobe. Asserted by the requesting agent to indicate the beginning of the Request Phase for a transaction. |

-continued

| Signal | Description |
| --- | --- |
| REQa0# | One of the request signals. Asserted by the requesting agent to indicate it has data to transfer (e.g., for a write transaction). |
| HITM# | Modified Hit. Asserted by a snooping agent to indicate that the request hits a modified cache line of the agent's cache. |
| TRDY# | Target Ready. Asserted by the targeted agent to indicate it is ready to receive data. |
| DBSY# | Data Bus Busy. Asserted by the agent transferring data to indicate it is using the data bus. |
| D[63:01]# | Data. The bus lines used to transfer the data. |
| DRDY# | Data Ready. Asserted by the agent transferring data to indicate valid data is on the bus. |
| RS[2:0]# | Response Status. Asserted by the targeted agent to indicate the status of the response (e.g., Retry Response, Deferred Response, Failure, Implicit Writeback Response, or Normal Data Response). |

FIG. 5 is a timing diagram illustrating the timing of signals in performing a two-agent write transaction according to one embodiment of the present invention. In the illustrated embodiment, a square is used to indicate the clock in which a signal is asserted, and a circle is used to indicate the clock in which a signal is sampled. As illustrated in FIG. 5, the requesting agents asserts an address strobe (ADS#) signal 501 and a request control signal (REQa0#) 502 in clock (CLK) 1, which are sampled in CLK 2 by the other agents on the bus. The ADS# signal 501 being asserted indicates that the request is beginning, and the REQa0# signal 502 being asserted indicates that the requesting agent has write data to transfer. The modified hit (HITM#) signal 503 remains inactive, indicating that the request has not hit a modified cache line.

The target agent asserts the TRDY# signal 504 in CLK 4, which the requesting agent observes active in CLK 5. The requesting agent observes the DBSY# signal 505 inactive in CLK 5, which allows it to begin the data transfer in the next clock cycle, CLK 6. The requesting agent asserts the data ready (DRDY#) signal 507 in CLK 6 to indicate that valid data is on the bus. The requesting agent drives the data on the data (D[63:0]#) lines 506 in CLK 6. The targeted agent then asserts response (RS[2:0]#) signals 508 in CLK 7, providing the completion information to the requesting agent (e.g., normal data response, retry-response, deferred response, etc.).

As illustrated in FIG. 5, the TRDY# signal 504 can be deasserted in CLK 6 because the TRDY# signal 504 is observed active and the DBSY# signal 505 is observed inactive in CLK 5. Alternatively, the TRDY# signal 504 could remain asserted in CLK 6 and not be deasserted until CLK 7.

FIG. 6 is a timing diagram illustrating the timing of signals in performing a read transaction with an implicit writeback, a three-agent transaction, according to one embodiment of the present invention. In the illustrated embodiment, a square is used to indicate the clock in which a signal is asserted, and a circle is used to indicate the clock in which a signal is sampled. As illustrated in FIG. 6, the requesting agent asserts the ADS# signal 501 in CLK 1, which is sampled in CLK 2 by the other agents on the bus. The ADS# signal 501 being asserted indicates that the request is beginning, and the REQa0# signal 502 being observed deasserted in CLK 2 indicates that the requesting agent does not have write data to transfer.

The snooping agent asserts a HITM# signal 503 in CLK 5, which is observed by the other agents on the bus in CLK 6, indicating that the request has hit a modified cache line in the snooping agent's cache. The targeted agent then asserts the TRDY# signal 504 in CLK 7, which is observed active by the snooping agent in CLK 8. The snooping agent observes the DBSY# signal 505 inactive and the TRDY# signal 504 active in CLK 8, resulting in the snooping agent beginning the data transfer in CLK 9. In CLK 9, the targeted agent deasserts the TRDY# signal 504 and the snooping agent asserts the DBSY# signal 505. Also in CLK 9, the snooping agent drives the modified cache line onto the bus on data (D[63:0]#) lines 506 and asserts the DRDY# signal 507 to indicate that valid data is on the bus. The targeted agent then asserts the response signals (RS[2:0]#) 508 in CLK 9, providing the completion information to the requesting agent (e.g., an implicit writeback response). In the illustrated embodiment, both the target agent and the requesting-agent latches the data from the bus 508.

It should be noted that in the illustrated embodiment, the snooping agent transfers four sets of eight bytes of data each (four data transfers on the D[63:0]# lines) as the implicit writeback data. This is due to the cache line size in the illustrated embodiment being 32 bytes, and the implicit writeback being a transfer of the entire cache line from the snooping agent to the target agent.

FIG. 7 is a timing diagram illustrating the timing of signals in performing a write transaction with an implicit writeback, a three-agent transaction, according to one embodiment of the present invention. In the illustrated embodiment, a square is used to indicate the clock in which a signal is asserted, and a circle is used to indicate the clock in which a signal is sampled. As illustrated in FIG. 7, the requesting agent asserts the ADS# signal 501 and a request control signal (REQa0#) 502 in CLK 1 and the other agents on the bus sample these signals 501 and 502 in CLK 2. The ADS# signal 501 being asserted indicates that the request is beginning, and the REQa0# signal 502 being asserted indicates that the requesting agent has write data to transfer.

The target agent asserts the TRDY# signal 504 in CLK 4 to indicate that it is ready to accept data. In CLK 5, the requesting agent observes the TRDY# signal 504 active and the DBSY# signal 505 inactive, so that the data transfer begins in CLK 6 with the requesting agent asserting the DBSY# signal 505 and the DRDY# signal 507, and driving data on the D[63:0]# lines 506. The DBSY# signal 505 remains active for one clock, indicating that the data transfer will complete in two clocks. The target agent then asserts the response (RS[2:0]#) signals 508 in CLK 9, which is observed by the requesting agent in CLK 10.

The snooping agent asserts the HITM# signal 503 in CLK 5, which is observed by the other agents on the bus in CLK 6, indicating that the request has hit a modified cache line in the snooping agent's cache. In CLK 7, the targeted agent asserts the TRDY# signal 504 for the implicit writeback data. In CLK 8, the snooping agent observes the TRDY# signal 504 active and the DBSY# signal 505 inactive, so the snooping agent begins the data transfer in CLK 9 with the assertion of the DBSY# signal 505. In the illustrated embodiment, the snooping agent is not ready to drive the implicit writeback data until CLK 11, so it does not assert the DRDY# signal 507 until CLK 11. The snooping agent then places the implicit writeback data on the bus in CLK 11.

In FIGS. 5–7 above, specific timing of the TRDY# signal 504 is discussed. As discussed above, the TRDY# signal 504 is asserted to indicate that the targeted agent is ready to receive data. Thus, the timing in the illustrated examples of FIGS. 5–7 would be changed if the targeted agent were not ready at the illustrated times. For example, in FIG. 6, the TRDY# signal 504 could be asserted in CLK 9 rather than CLK 7 if the targeted agent were not ready to begin receiving data until CLK 9. It is to be appreciated that, delaying assertion of the TRDY# signal 504 for two clocks would result in a corresponding two-clock delay of the assertion of the DBSY# signal 505, the DRDY# signal 507, the RS[2:0]# signals 508, and the data being driven on the D[63:0]# lines 506.

In some of the discussions above, the memory controller is described as being responsible for assertion and deassertion of the TRDY# signal to control data flow on the bus. It is to be appreciated, however, that other agents on the bus may also control data flow for certain transactions. For example, if a request targets the mass storage device 125 of FIG. 1, or one of the agents on the system I/O bus 131 (via the bridge 124), then the storage device 125 or bridge 124, respectively, would have control of the data flow on the bus.

Thus, the present invention provides a mechanism for controlling data flow on a bus which supports two- and three-agent transactions. The mechanism advantageously allows the agent which is to receive the data to control the flow of the data on the bus, thereby avoiding the possible situation of data being placed on the bus and the agent not having sufficient storage space for the data. Furthermore, the data flow control is provided to the agent which is to receive the data, regardless of whether the agent is the targeted agent of the transaction.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

Thus, a data flow control mechanism for a bus supporting two- and three-agent transactions has been described.

What is claimed is:

1. A method for controlling data flow for transactions issued on a pipelined computer system bus, the method comprising:

(a) a first agent issuing a request on the bus;

(b) a second agent providing a first indication to the first agent that the second agent is ready to accept data corresponding to the request;

(c) the first agent placing the data corresponding to the request on the bus in response to receiving the first indication;

(d) the second agent providing a second indication to a third agent that the second agent is ready for writeback data corresponding to the request from the third agent; and (e) the third agent placing the writeback data corresponding to the request on the bus in response to receiving the second indication.

2. The method of claim 1, wherein providing a first indication comprises asserting a control line of the computer system bus.

3. The method of claim 1, wherein providing a second indication comprises asserting the control line of the computer system bus.

4. A computer system comprising:

a pipelined bus;

a first agent coupled to the bus;

a second agent coupled to the bus;

a third agent coupled to the bus;

wherein the first agent includes a first bus control logic to place a write request on the bus, and also to delay placing data on the bus corresponding to the write request until a first indication that the second agent is ready to accept data has been received from the second agent; wherein the second agent includes a second bus control logic to provide the first indication to the first agent that the second agent is ready to receive data corresponding to the write request from the first agent; and wherein the third agent includes a third bus control logic to receive a second indication, from the second agent, that the second agent is ready to receive data corresponding to the write request from the third agent.

5. The computer system of claim 4, wherein the first bus control logic is also to place the data on the bus in response to the first indication.

6. The computer system of claim 4, wherein the first agent is a microprocessor.

7. The computer system of claim 6, wherein the second agent is a memory controller.

8. The computer system of claim 4, wherein the first indication and the second indication comprise the same control line of the bus.

9. The computer system of claim 4, wherein the bus is a latched bus.

10. An apparatus for providing flow control for transactions issued on a pipelined computer system bus, the apparatus comprising:

means for issuing, by a first agent, a request on the bus;

means for providing, by a second agent, a first indication to the first agent that the second agent is ready to accept data corresponding to the request; and means for placing, by the first agent, data corresponding to the request on the bus in response to receiving the first indication;

means for providing, by the second agent, a second indication to a third agent that the second agent is ready for writeback data from the third agent; and means for placing, by the third agent, the writeback data on the bus in response to receiving the second indication.

11. The apparatus of claim 10, wherein the means for providing a first indication comprises a control line of the computer system bus.

12. The apparatus of claim 11, wherein the means for providing a second indication comprises the control line of the computer system bus.

13. A method for controlling data flow for transactions issued on a pipelined computer system bus, the method comprising the steps of:

(a) a step for a first agent issuing a request on the bus;

(b) a step for a second agent providing a first indication to the first agent that the second agent is ready to accept data corresponding to the request;

(c) a step for the first agent placing the data corresponding to the request on the bus in response to receiving the first indication;

(d) a step for the second agent providing a second indication to a third agent that the second agent is ready for writeback data corresponding to the request from the third agent; and (e) a step for the third agent placing the writeback data corresponding to the request on the bus in response to receiving the second indication.

14. The method of claim 13, wherein the step for providing a first indication comprises asserting a control line of the computer system bus.

15. The method of claim 13, wherein the step for providing a second indication comprises assessing the control line of the computer system bus.

* * * * *